W. M. JONES, Jr.
TIRE MAKING AND REPAIRING DEVICE.
APPLICATION FILED JAN. 30, 1920.
1,396,217.
Patented Nov. 8, 1921.
4 SHEETS—SHEET 3.
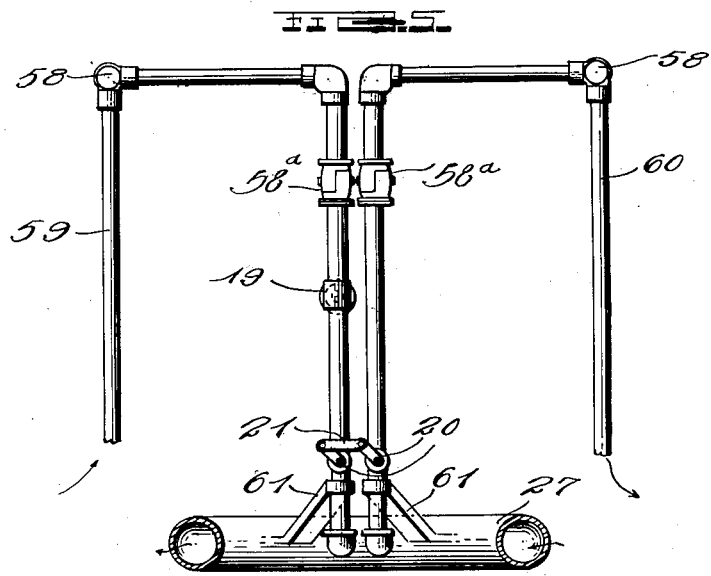
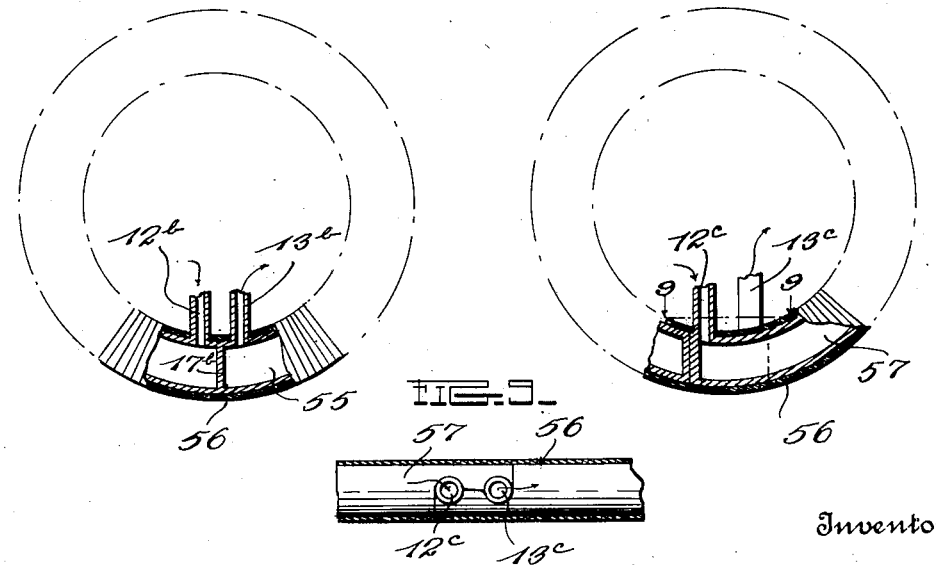
Witness
George W. Gosmith
Inventor
W. M. Jones Jr.
By H. B. Willson &co.
Attorneys

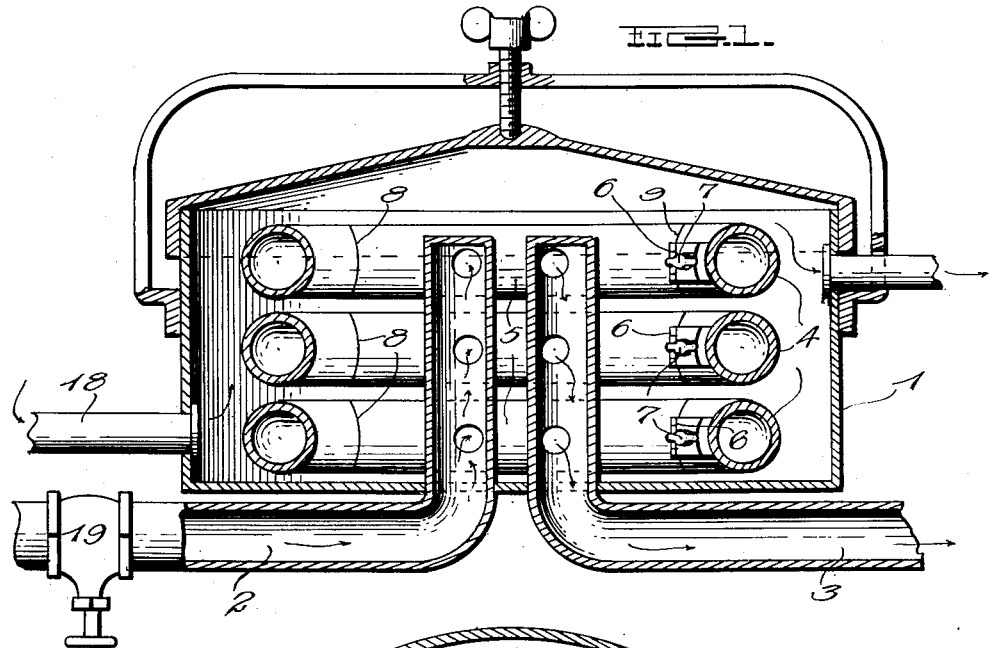
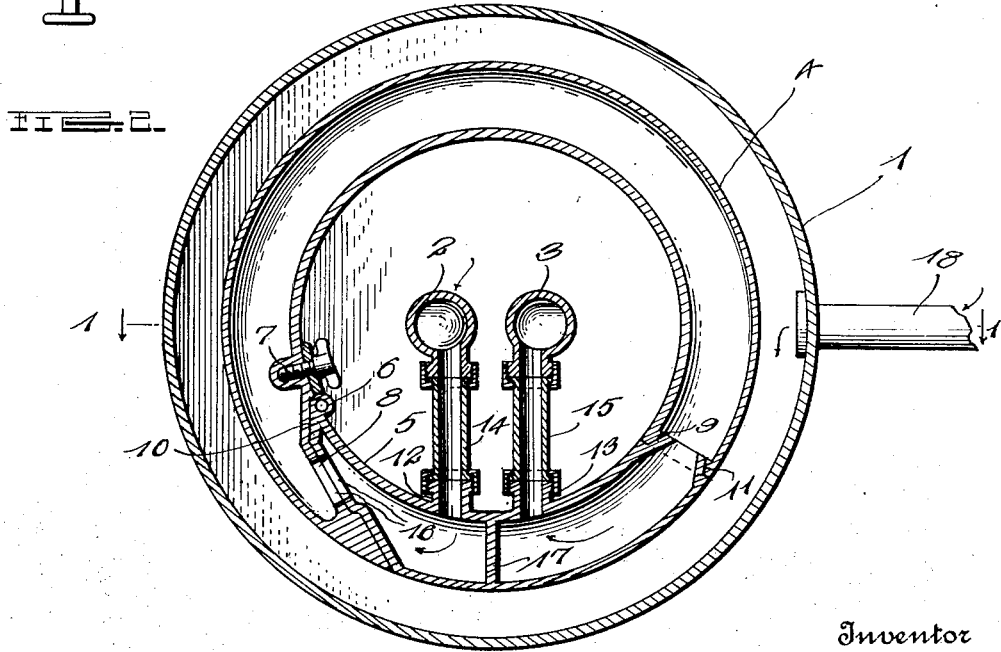

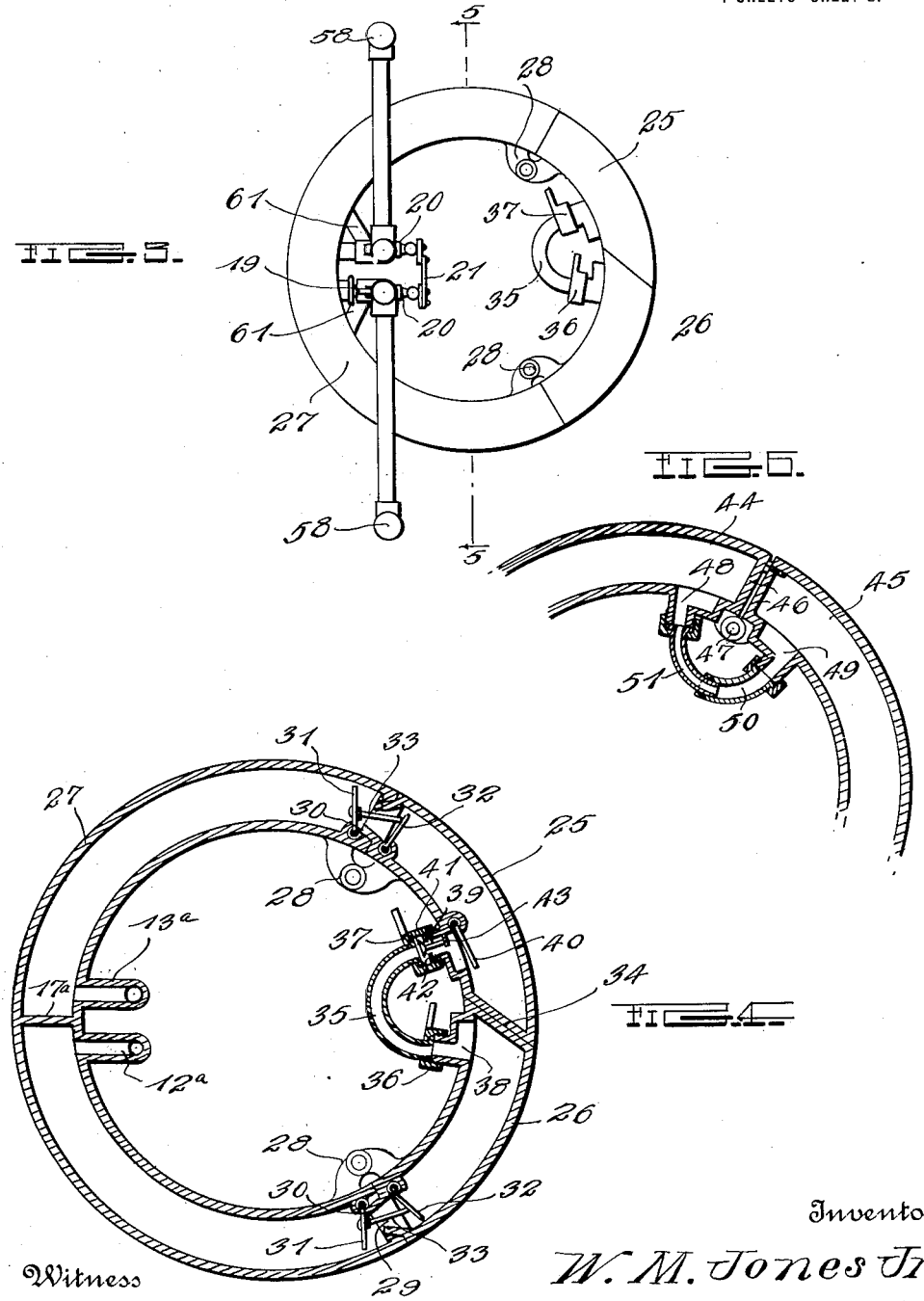

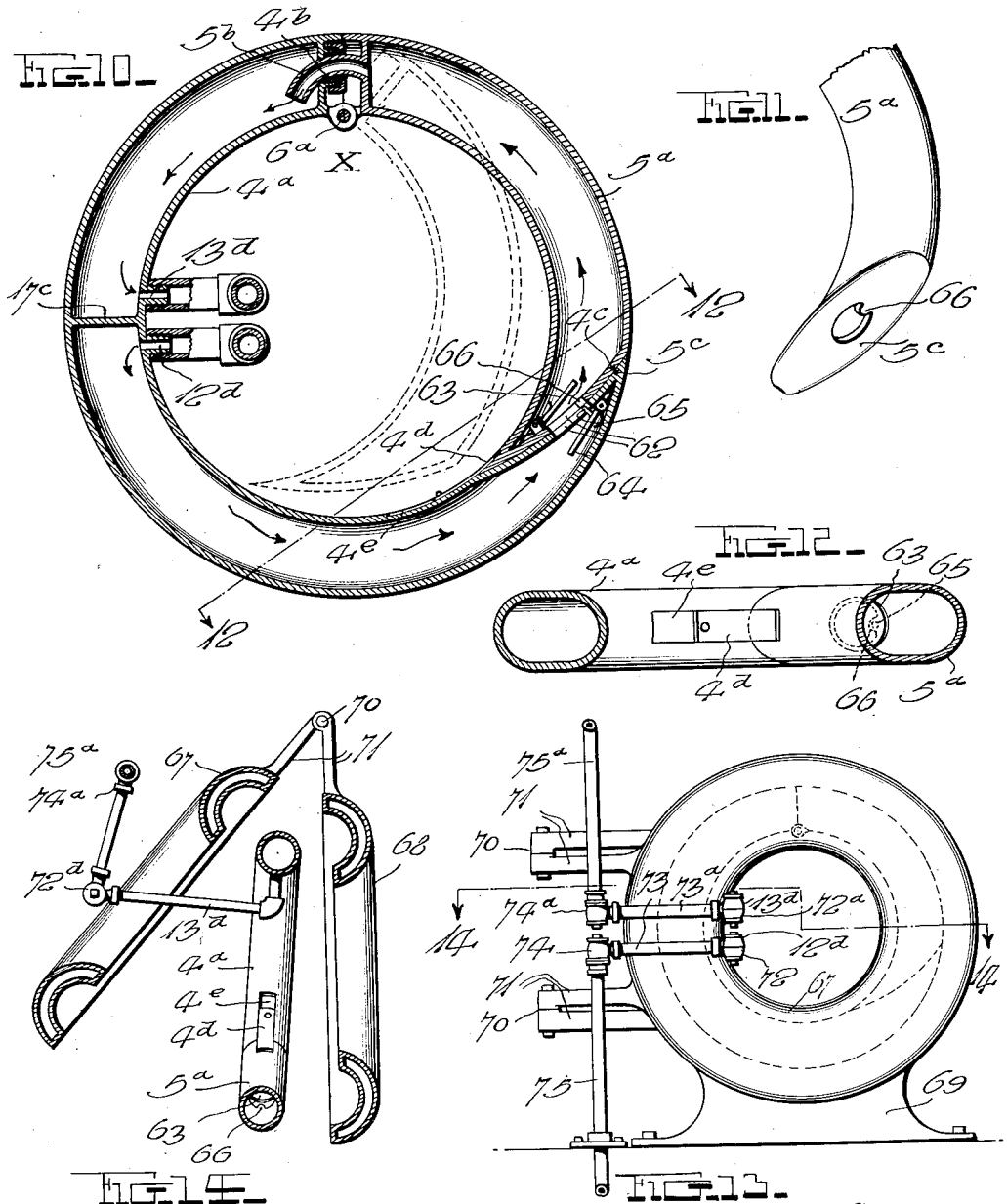

UNITED STATES PATENT OFFICE.

WILLIAM MARTIN JONES, JR., OF ROCHESTER, NEW YORK.

TIRE MAKING AND REPAIRING DEVICE.

1,396,217.  Specification of Letters Patent.  Patented Nov. 8, 1921.

Application filed January 30, 1920. Serial No. 355,063.

*To all whom it may concern:*

Be it known that I, WILLIAM MARTIN JONES, Jr., a citizen of the United States, residing at Rochester, in the county of Monroe and State of New York, have invented certain new and useful Improvements in Tire Making and Repairing Devices; and I do declare the following to be a full, clear, and exact description of the invention, such as will enable others skilled in the art to which it appertains, to make and use the same.

This invention relates to tire vulcanizing devices, and more particularly to an improved tire-supporting and cooling device for use in the operation of vulcanizing tires.

One object of this invention is to generally improve upon devices of this character by providing an improved tubular annulus or hollow core which is quickly and easily collapsible with respect to its main or annular radii, but has a fixed tubular diameter, or will not easily collapse or expand with respect to its lesser or tubular radii, so that tires or casings of a standard tubular diameter can be built, supported and vulcanized thereon, and that the forming device can be quickly and easily removed from the finished or partly finished tires or casings being formed or repaired thereon.

Another object is to provide an improved means for effecting a complete and rapid circulation of water through the hollow core, for regulating the temperature of the inner lining of the tire, while its outer portions are being vulcanized or cured by the application of heat, thereby preventing over-vulcanizing of the inner lining.

Another object is to provide an improved arrangement wherein a hollow core is connected with a means for causing fluid to flow therethrough and for supporting the core while being placed in and removed from a tire mold or other casing; also to provide an improved form of annular mold including a movable annular section through which extend the pipes through which cooling fluid passes into and circulates through the mold and passes out of the mold.

Other objects and advantages will be specifically pointed out or implied in the following details of description, in connection with the accompanying drawings in which:

Figure 1 is a central vertical sectional view through a steam-chamber and through a plurality of my improved cooling devices arranged for supporting tires in position to be vulcanized or cured by the action of steam thereon and counter-action of a cooling fluid within the cooling devices, the section being taken along the line 1—1 of Fig. 2.

Fig. 2 is a horizontal sectional view.

Fig. 3 is a top plan view of a modified form of tubular annulus or cooling device.

Fig. 4 is an enlarged horizontal sectional view of the modified form shown in Fig. 3.

Fig. 5 is a vertical sectional view along the line 5—5 of Fig. 3.

Fig. 6 is a fragmentary detail view showing a modified form of connection between two hinged segments of the tubular annulus.

Fig. 7 is a modified form of the tubular annulus.

Fig. 8 is still another modified form of the tubular annulus.

Fig. 9 is a fragmentary sectional view along the line 9—9 of Fig. 8.

Fig. 10 is a diametral sectional view illustrating another modified form of the improved annular core.

Fig. 11 is a detail perspective view of a portion of the structure shown in Fig. 10.

Fig. 12 is a sectional view along the line 12—12 of Fig. 10.

Fig. 13 is an elevation of an improved vulcanizing mold, a core associated with the mold and water supply and discharge pipes supporting the core within the mold, the core being shown in dotted lines.

Fig. 14 is a view principally in horizontal section, the section being taken substantially along the line 14—14 of Fig. 13.

Referring to the drawings in detail, in which similar reference characters correspond with similar parts throughout the several views, and in which the steam-chamber 1, fluid supply pipe 2 and fluid discharge pipe 3 are illustrated merely to show one mode of applying the device, the invention consists in the details of construction which will hereinafter be specifically described and claimed.

In the form illustrated in Figs. 1 and 2, the tubular annulus is preferably of metal or other comparatively rigid material and consists of two tubular segments and means for movably or removably securing these segments together in communicative relation. That is, it consists of a greater segment 4, a lesser segment 5, a hinge 6 and a screw 7, the latter being preferably in the form of a thumb-screw and being quickly and easily movable so that the greater and lesser segments can be disconnected from one another when desirable. However, instead of entirely disconnecting these segments from one another, they may be moved with relation to one another about the pintle or screw 7 and about the pintle of the hinge 6, so as to disconnect the bosses or end projections 8 and 9 from their respective sockets 10 and 11. When thus disconnecting the segments 4 and 5, the latter yields or springs out sufficiently to permit the elements 8 and 9 to be forced out of their sockets. The lesser segment 5 is provided with an inlet 12 and an outlet 13, these elements being connected to the respective inlet and outlet pipes 2 and 3 by means of threaded unions 14 and 15 respectively. It should be understood, however, that any appropriate form of pipe unions may be employed or substituted for the unions 14 and 15. These unions may constitute the sole support for the lesser segment, and the latter may constitute the sole support for the greater segment, although supplemental supports may be provided if necessary or desirable. By disconnecting the unions 14 and 15, each hollow core can be taken out of chamber 1 and then the wrappings may be removed from the tire or casing, and by disconnecting or loosening the screw 7, the lesser segment may be moved inward and caused to pass through the space between the edges or beads of the outer tire casing, whereupon, the casing may be easily removed from the greater segment.

Referring again to the assembled device, as shown in Fig. 2, it will be seen that the greater and lesser segments are provided with registering apertures through their hinged portion, as indicated at 16, the lesser segment also communicating with the greater segment through an opening in the end projection or boss 9. A partition 17 is provided in the intermediate portion of the lesser segment, between the inlet 12 and the outlet 13, thereby positively defining the ends of the passage (in the annulus) which communicates with the inlet 12 and outlet 13.

In operation, having placed one or more tire casings in the steam-chamber 1, on one or more of the annular cooling devices, this casing is closed, steam is admitted through a pipe 18, and water or other cooling fluid is admitted through the pipe 2. While the steam is curing the outer portion of the tire, the water within the tubular annulus maintains the proper temperature for preventing the inner lining of the tire from becoming over-vulcanized. In order that the water may be maintained at a comparatively even temperature, it is permitted to continually circulate throughout the annular extension of the annulus, and moreover, the rate of flow or circulation may be controlled by means of a valve 19. (see Figs. 1 and 5). By thus controlling the rate of flow, and retaining the water within the annulus for a greater or lesser period of time under the heating influences, the water is raised to a higher or lower temperature before being discharged from the annulus. Valves may be provided in the inlet and outlet 12 and 13, such as indicated at 20 in Fig. 5, and these valves may be connected together by means of a link 21, so that both the inlet and outlet may be simultaneously closed by operation of the link 21, or such valves 20 may be provided in the inlet and outlet pipes 2 and 3 instead of in the inlet and outlet 12 and 13. Moreover, automatic valves may be provided in the apertures 16 and in the open end 9 and adjacent open end of the greater segment, such valves being shown and described in connection with the modified form which is shown by Fig. 4 of the drawings.

Referring now to Figs. 3 and 4, it will be seen that two lesser segments 25 and 26 are pivotally connected to the greater segment 27 by means of hinges 28. In this modified form, the hinged ends of the segments are provided with connections similar to those shown at 9—11 in Fig. 2, the greater segment being in communication with the lesser segments through openings 29. Each of the lesser segments is provided with a projection 30 which extends into the greater segment so as to press against a valve 31 and hold the same open when the segments are arranged in position to form the annulus. A valve 32 is provided in the hinged end of each lesser segment, and each of these latter valves is controlled by means of a pin or stud 33 which is supported by the adjacent valve 31. When the lesser segments are swung radially inward on their hinges 28, the valves 31 and 32 are permitted to close and prevent the flow of water through the openings in the hinged ends of the segments. Springs may be provided for closing the valves 31 and 32, but they are ordinarily closed automatically by the pressure of water thereagainst. It should be understood that the valves 31 and 32 are approximately circular in cross section, and of a diameter approximately equal to that of the tubular diameter of the segments, and therefore, they can not open to an extent greatly in excess of that shown in Fig. 4.

The ends of the lesser segments which abut against one another may be closed so as to form a partition in the annulus, as indicated at 34, and a tubular by-pass 35 may be connected by means of couplings 36 and 37 to the radially extending passages 38 and 39 of the segments 25 and 26 respectively. A valve 40 is provided to close the passage 39 against back-pressure of water in the segment 26, and a valve 41 may be provided to close the passage or by-pass 35, this valve 41 coöperating with a valve seat 42 for closing this by-pass. The stem of the valve 41 abuts against a stop 43 of the segment 26 and the valve 41 is held open thereby when the parts are in the normal position shown in Fig. 4. However, when the coupling 37 is loosened and the segment 27 is swung radially inward, the by-pass 35 is separated from the passage 39, and the valve 41 now closes upon its seat 42, being released from control of the stop 43.

This form of the invention is provided with a partition 17$^a$, an inlet 12$^a$ and an outlet 13$^a$, so that water or other cooling fluid may circulate throughout the annular extension of the annulus as previously described.

In the modified form shown in Fig. 6, the hinged ends of the segments 44 and 45 are closed so as to provide a partition 46, and no valves are required for closing the ends of these segments when they are swung radially inward on their hinge 47. A tubular by-pass connects with the passages 48 and 49, this tubular by-pass being collapsible or telescopic. That is, it is formed of a larger curved pipe 50 and a smaller curved pipe 51, the latter being slidable longitudinally in the former, a water-tight joint being provided between these curved pipes. Therefore, water passes from one of the segments to the other through the medium of this by-pass, and the latter prevents leakage while telescoping to permit the segments to be swung on their hinge with relation to one another.

Instead of making the tubular annulus with hinged joints, it may be in one piece, or one unjointed annulus such as illustrated in Fig. 7. In this case, the device is composed of an inner tube 55 and an outer tube 56, the former being preferably composed of rubber or a composition of rubber and fabric, the outer tube 56 being composed of a helical winding or coil of flat wire, and therefore, the device is flexible with respect to its annular radii, but non-flexible or rigid with respect to its tubular radii. This structure is provided with a partition 17$^b$, an inlet 12$^b$ and an outlet 13$^b$. Controlling valves 19 and 20, such as illustrated in Figs. 1 and 5, may be employed in connection with the inlet and outlet of this form of the invention.

For the purpose of providing a device of this character which is contractible and expansible, with respect to its annular radii or circumference, the device illustrated in Figs. 8 and 9 may be provided, this device comprising a flexible annular tube 57 which is adapted to be inserted in a flexible outer tube such as indicated at 56 in Fig. 7. This flexible tube 57 has its ends lapped upon one another as indicated in Fig. 9, this figure showing the approximate relative positions of the closed ends of the tube when the latter is confined against excessive expansion by means of the outer tube 56. It will be seen that by lapping the ends to a greater or less extent, the diameter of the annulus is decreased or increased. This form of the device is provided with an inlet 12$^c$ and an outlet 13$^c$.

Referring again to the structure disclosed in Figs. 3 and 5, it will be seen that the inlet and outlet may be connected with pipes having hinge joints 58 and 58$^a$ so that the annulus may be disposed in the horizontal position shown in Fig. 5 or at any appropriate angle relative to this position while remaining in connection with the supply and discharge pipes 59 and 60.

Braces 61 may be connected with the inlet and outlet passages or pipes, so that the latter are thereby assisted in properly supporting the annulus.

In the modified form shown in Fig. 10, the partition 17$^c$ is disposed between the inlet or pipe 12$^d$ and outlet 13$^d$, and the lesser segment 5$^a$ is hinged to the greater segment 4$^a$ by means of a pivot 6$^a$, the latter having its axis parallel with the axis of the annulus formed by the greater and lesser segments. The greater segment is provided with a packing 4$^b$ through which extends a reduced tubular extension 5$^b$ which is curved about the axial center of the pivot 6$^a$. This tubular extension is slidable through the packing 4$^b$ and forms a fluid-tight joint with said packing. Therefore, when the lesser segment is swung inward to the dotted line position, the curved extension 5$^b$ slides in the packing 4$^b$ and maintains the fluid-tight connection, at the same time maintaining its open communication with the interior of the greater segment, so that no leakage will occur at this hinged portion of the annulus.

The free ends of the greater segment is concaved as indicated at 4$^c$, and the free end of the lesser segment is convexed as indicated at 5$^c$, the mutual axis of canvexity and concavity of these ends being spaced from the pivot 6$^a$ in such relation that said greater segment does not resist the inward movement of the lesser segment on said pivot. In the present instance, the axis of convexity and concavity is located at the center of the letter X, but it should be understood that the position of this axis may be changed according to the desire of the manufacturer. The concaved and convexed surfaces 4$^c$ and 5$^c$ may fit against one another so perfectly as to prevent leakage, or a gasket or other anti-leaking means (not shown) may be employed. Any appropriate fastening means my be employed for locking or holding the concaved and convexed ends in position against one another as shown in full lines in Fig. 10, and to illustrate one form of securing device, I have shown a slide-bolt 4$^d$ which is fitted in a groove 4$^e$ which may be dove-tailed for securing the bolt 4$^d$ in the groove.

The free ends of the greater and lesser segments are partially closed by the walls which include the surfaces 4$^c$ and 5$^c$, and these walls have normally registering openings therethrough (as indicated at 62. A check valve 63 is mounted for closing the opening 62 of the lesser segment) and a valve 64 is pivotally mounted within the greater segment and adapted to close the opening 62 of the latter. These valves 63 and 64 are automatically closed by fluid-pressure when the free ends of the segments are separated from one another, so that only a slight quantity of water of other fluid escapes during the opening and closing of the annulus. The water or fluid passes in the direction of the arrows through the annulus, and it is necessary, therefore, to provide an appropriate means for opening the valve 64 against the pressure or fluid from the inlet pipe 12$^d$. For this purpose, a finger 65 is provided on the valve 64, and an abutment 66 is provided with an inward extension of the material around the opening 62 of the lesser segment. The finger 65 normally rests on the extension 66 and holds the valve 64 open, but releases the valve 64 and permits it to close when the lesser segment is swung inward. However, when the lesser segment is swung outward so as to seat the surface 4$^c$ against the surface 5$^c$ and bring the openings 62 into registration, the abutment 66 comes into contact with the finger 65 and coacts therewith to hold the valve 64 open.

The core illustrated in Fig. 14 is shown as being of the same construction as that in Fig. 10, but it is to be understood that any hollow core within the scope of this invention may be used in connection with the form of mounting and the form of circumferentially split mold which will now be described in connection with Figs. 13 and 14 as follows.

This form of mold consists of two angular halves or annular sections 67 and 68 which are similar in all respects except that the latter is provided with a base or pedestal 69 or with any appropriate supporting means whereby it is held in the upright or axially horizontal position illustrated, and the section 67 is hinged to the stationary section 68 by means of hinges 70 formed at the outer ends of two pairs of radial arms 71 of the respective sections 67 and 68. The inlet and outlet pipes 12$^d$ and 13$^d$ extend through the annular space of the movable mold section 67 and are pivotally connected at 72 and 72$^a$ to two tubular link-sections 73 and 73$^a$. These link-sections are pivotally connected at 74 and 74$^a$ to the stationary inlet and outlet pipes 75 and 75$^a$ respectively. These pipes are in open communication with the pipes or link-sections 73 and 73$^a$ and the latter are in open communication with the hollow core through the medium of the pipe sections 12$^d$ and 13$^d$ respectively. Moreover, the pipe section 75 is in open communication with any appropriate supply of cold water or other cooling fluid, while the pipe section 75$^a$ may convey the cooling fluid to any appropriate place or receptacle. The pivotal connections of these inlet and outlet pipes or conduits are vertically disposed and in such relation to one another that the pipe sections 12$^d$ and 13$^d$ can be swung horizontally about their pivotal connections while being supported by these pivotal connections, and in turn, the link sections 73 and 73$^a$ can be swung horizontally on their pivotal connections or supports 74 and 74$^a$.

Although it is obvious that the pipe sections and their pivotal connections can be made sufficiently strong and rigid to support the core and a tire on the core independently of any auxiliary support, it is not beyond the scope of this invention to provide any appropriate auxiliary support to prevent sagging of the core and a tire to be supported thereby. Moreover, as indicated in Figs. 1 and 5, the invention does not depend on supporting the core in its upright position shown in Figs. 13 and 14, and when the casing is disposed in the horizontal position shown in Fig. 5, the pipes or conduits need not be depended upon to support the weight of the core and tire, and in this latter case, flexible pipes may be employed, such as hosepipe.

When the inlet and outlet pipes extend into a vulcanizing chamber, such as illustrated in Figs. 1 and 2, the portions of these pipes within the chamber may be covered with asbestos or other heat-insulating material (not shown), so that the water remains cool while passing through these pipes into the hollow cores.

Although this device is useful as a tire making device, it is understood that it is especially useful in the repairing of tires or tire casings where it is vitally important to keep the previously vulcanized parts cool and thereby prevent over-vulcanizing. Moreover, this invention is not limited to the exact details of construction and arrangement disclosed by the drawings and foregoing description, but changes may be made within the scope of the inventive ideas as implied and claimed.

Although one or more of the valves 19 and 20 and link 21 are omitted in Figs. 1, 2, 4, 7, 8 and 9, 10 and 13 of the drawings, it is intended to employ these members in all the forms, this being permitted in the modification shown in Figs. 8 and 9 because their inlets and outlets are flexible.

What I claim as my invention is:

1. A tire vulcanizing core, a tubular annulus having a partition therein and having a continuous passage throughout its circumferential extent from one side to the other side of said partition, a fluid-inlet at one side of and adjacent to said partition, and a fluid-outlet at the other side of and adjacent to said partition, said fluid-outlet and fluid-inlet extending inwardly of the core, so that these fluid carrying elements extend between the beads of the tire-casing when the core is in the casing, and so that the current of fluid can be effected substantially through the circumferential extent of the core for the purpose specified.

2. The structure defined by claim 1, and said tubular annulus being adjustable with respect to its annular radii and secured against adjustment with respect to its tubular radii.

3. In a tire vulcanizing core, a tubular annulus having a partition therein, a fluid-inlet at one side of and adjacent to said partition, a fluid-outlet at the other side of and adjacent to said partition, a valve in said inlet, a valve in said outlet, and a link connecting said valves and being operable to simultaneously actuate the valves.

4. In a tire vulcanizing core, a tubular annulus comprising a greater segment and a lesser segment, the latter being movable relative to the greater segment to leave a substantially clear space between the ends of the greater segment, means to secure the ends of said greater segment in open communication with those of the lesser segment, and means to provide a current of fluid through said segments when their ends are thus secured in open communication.

5. In a tire vulcanizing core, a tubular annulus comprising a greater segment and a lesser segment, the latter being hinged to the greater segment and movable on its hinge into the arcuate space defined by the greater segment to leave a substantially clear space between the ends of the greater segment, means to secure the free ends of said segments in open communication with one another, and means to provide a current of fluid through said segments when their ends are thus secured in open communication.

6. In a tire vulcanizing core, a tubular laterally split annulus provided with openings in its normally meeting ends for permitting fluid to pass from one to the other of said meeting ends, one end portion of said annulus being movable inward relative to the other end portion, a valve mounted to close one of said open ends, and means to automatically open said valve upon bringing the open ends of the annulus into communication with one another.

7. In a tire vulcanizing core, a tubular laterally split annulus provided with openings in its normally meeting ends for permitting fluid to pass from one to the other of said meeting ends, one end portion of said annulus being movable inward relative to the other end portion, a valve mounted to close one of said open ends, and a finger carried by said valve and extending through the adjacent open end, the other end of the annulus being provided with means to coact with said finger for opening said valve.

8. The structure recited in claim 6, and a check valve mounted to close the other end of the annulus, said check valve being closable by back pressure of fluid when said ends are out of contact with one another, said check valve being adapted to be automatically opened by the forward pressure of fluid when the first mentioned valve has been opened.

9. In a tire vulcanizing core, a tubular annulus comprising a greater segment and a lesser segment secured to one another by means of a pivot which is parallel with the axis of the annulus and disposed substantially at the inner periphery of the annulus, one of said segments having a packing in its hinged end, the other of said segments having a curved tubular extension projecting through said packing and slidable therein for maintaining these hinged ends in a fluid-tight condition when the lesser segment is swung inward.

10. The combination of two hollow members normally connected in such relation that an opening of one of these hollow members is in registration with an opening of the other hollow member, one of these communicating openings being provided with a valve to close it when these openings are out of registration, and means carried by said valve and by one of said hollow members for opening said valve of the other hollow member when the openings of said hollow members are brought into registration.

11. In a tire vulcanizing device, an annular core, an annular vulcanizing mold to receive a tire having said core therein, said mold comprising two annular sections normally joined at their outer circumferences and being separable from one another, and a hinge-jointed support carrying said core and permitting the core to be moved into and out of one of said annular sections while thus supported.

12. In a tire vulcanizing device, an annular core, an annular vulcanizing mold to receive a tire having said core therein, said mold comprising two annular sections normally joined at their outer circumferences and being separable from one another, this mold being provided with a space between the inner peripheries of these annular sections, and a flexible conduit having one end normally extending through the annular opening of one of said sections, through said space and into engagement and open communication with said core.

13. In a tire vulcanizing device, an annular tubular core, an annular vulcanizing mold to receive a tire having said core therein, said mold comprising two annular sections normally joined at their outer circumferences and being provided with radial extensions which have their outer end portions hinged to one another, one of said annular sections being stationary and supporting the movable section through the medium of the radial extensions and hinge, a stationary supporting fluid supply pipe, a pipe section hinged to and openly communicating with said stationary pipe, and an inlet pipe section hinged to the first said pipe section and openly communicating therewith and with the interior of said tubular core, the latter having an outlet adjacent to its connection with said inlet pipe section and having a partition between its inlet and outlet, whereby the hinged pipe sections constitute means to cause fluid to circulate through the core and also constitute means to support said core.

14. A tire vulcanizer comprising a cooling device consisting of a core for reception in a tire, said core having a water circulating passage extending throughout the length of its curvilinear dimension, a water inlet at one end of said passage, and a water outlet at the other end thereof.

15. A structure as specified in claim 14, together with means for controlling the rate of water circulation through said passage and thereby controlling the cooling efficiency of the core.

In testimony whereof I have hereunto set my hand.

W. MARTIN JONES, Jr.